No. 619,285. Patented Feb. 14, 1899.
W. M. DIGBY.
HARROW.
(Application filed Dec. 6, 1897.)
(No Model.)
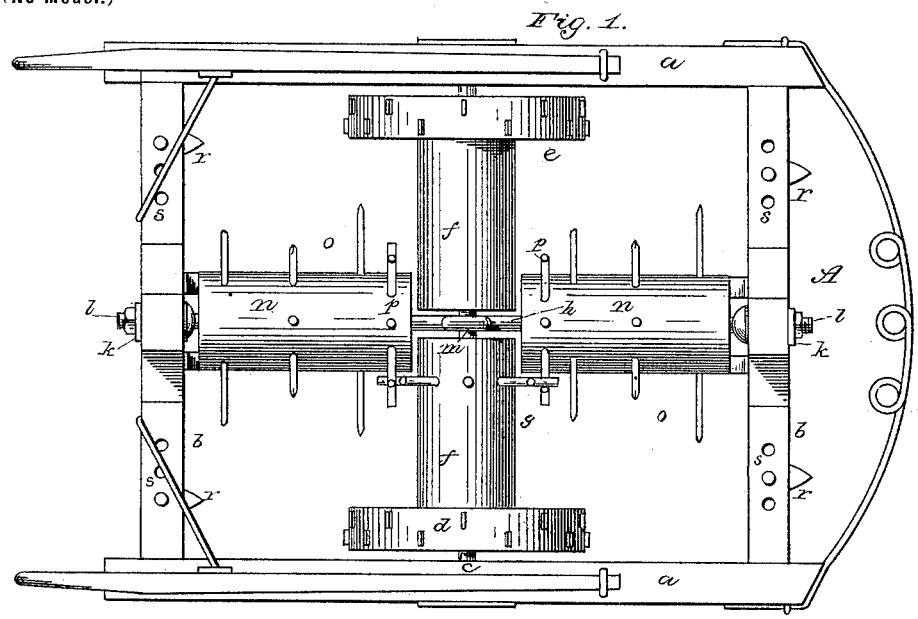
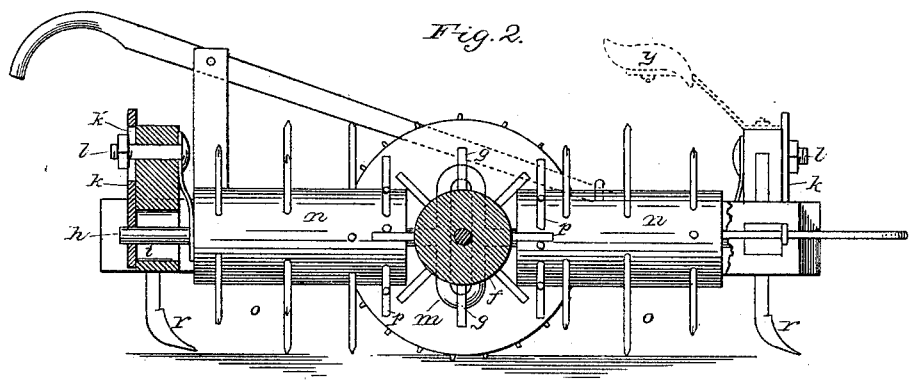
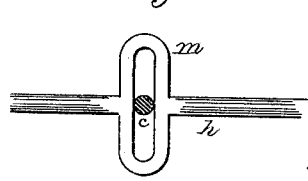
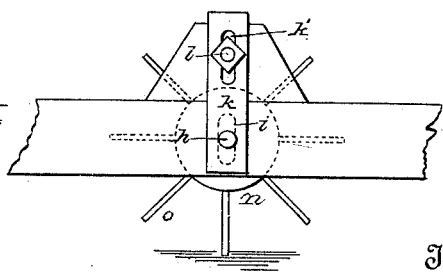
Witnesses
George H. Lamar
J L Bullock
Inventor
Wiley Martin Digby
per J. C. De Putron
J W Garner
Attorneys

UNITED STATES PATENT OFFICE.

WILEY MARTIN DIGBY, OF SIMCOE, ALABAMA.

HARROW.

SPECIFICATION forming part of Letters Patent No. 619,285, dated February 14, 1899.

Application filed December 6, 1897. Serial No. 660,910. (No model.)

*To all whom it may concern:*

Be it known that I, WILEY MARTIN DIGBY, a citizen of the United States, residing at Simcoe, in the county of Cullman and State of Alabama, have invented a new and useful Improvement in Harrows; and I hereby declare that the following is a full, clear, and exact description of the invention, which will enable others skilled in the art to which my invention relates to make and use the same, reference being had to the accompanying drawings, which form a part of this specification.

My invention relates to an improvement in harrows; and it consists in the peculiar construction and combination of devices, which will be more fully set forth hereinafter and particularly pointed out in the claims.

In the accompanying drawings, Figure 1 is a top plan view of a harrow embodying my improvements. Fig. 2 is partly a side elevation of the same and partly a section, taken on the line $x\,x$ of Fig. 1. Figs. 3 and 4 are detail views.

The frame A of the harrow, which is of rectangular form, consists of the side beams $a$ and the front and rear end bars $b$. The said frame is preferably made of wood. A shaft $c$ is arranged transversely at the center of the frame and has its ends secured in the beams $a$, and on the said shaft are mounted the driving and supporting wheels $d\,e$. Said wheels are of any preferred construction and are provided with rim teeth or corrugations to engage the ground and cause the wheels to rotate when in contact therewith and the harrow is in motion, and the said wheels are further provided with inward-extending hubs or sleeves $f$. A series of tappet-teeth $g$ project radially from the sleeve or hub of the wheel $d$, near the inner end thereof.

A shaft $h$ is arranged longitudinally in the frame, in the center thereof, and has its ends passed through vertically-extended openings $i$, which are made in the front and rear end bars $b$. The ends of the said shaft are supported in adjusting-plates $k$, which plates are made of iron or steel, are preferably rectangular in shape, and are secured on the end bars by means of bolts $l$, which extend through and are adapted to move vertically in the openings $k'$ in the adjusting-plates, and hence the said shaft may be raised or lowered and secured at any desired adjustment vertically by tightening the taps on the said bolts. In the central portion of the shaft $h$ is formed a vertical link $m$, through which the shaft $c$ passes, and this link adapts the shaft $h$ to be raised or lowered without coming in contact with the shaft $c$, which it would otherwise do.

The harrow drums or cylinders $n$ are mounted on the shaft $h$ and adapted to revolve thereon and are of such length as to extend from near the front and rear end bars of the frame to within a short distance of the wheel hubs or sleeves, practically the entire length of the harrow. Each of the said harrow drums or cylinders is provided with a series of harrow-teeth $o$ of suitable length and which are arranged spirally on the said drums or cylinders, and the latter are further provided with tappet-teeth $p$, which engage with the tappet-teeth on the hub of wheel $d$, and hence as the said wheel revolves when the harrow is being drawn across a field the tappet-teeth cause a rotary motion to be communicated to the harrow-drums and to revolve them in opposite directions, as will be understood, and their harrow-teeth therefore operate at right angles to the line on which the harrow is being drawn and serve to thoroughly stir and pulverize the soil. Teeth or shovel-points are also secured to the end bars of the frame, as at $r$, said end bars having series of openings $s$ for that purpose and which admit of the said teeth or shovels being adjusted laterally on the said bars.

By reason of the shaft $h$ being movable vertically and by reason of the plates and bolts by which it may be secured at any desired vertical adjustment the depth at which the harrow-teeth operate can be determined and controlled, and the revolving harrow-drums may be also raised sufficiently to cause the teeth thereof to clear the ground when the harrow is being transported to or from a field and it is not desired that the same shall operate.

My improved harrow is capable of use as a cultivator by running the same between rows of growing plants, and by providing the cylindrical drums with chopping-hoes instead of harrow-teeth the same may be perfectly adapted for use as a cotton-chopper.

I propose to provide the harrow with handles, by means of which it may be guided and controlled by a person on foot in rear thereof, and I also propose to provide the harrow with a seat $y$, (indicated in Fig. 2,) by means of which the operator may be seated when the harrow is in use.

Having thus described my invention, I claim—

1. In a harrow, the combination of the frame, the longitudinal shaft $h$ vertically adjustable in the frame and having the vertical link $m$, the harrow-drums revoluble on the said shaft, the axle-shaft $c$, arranged transversely in the frame and passing through the link $m$, and the drive-wheels on the said axle-shaft, one of the said drive-wheels having teeth $g$ engaging similar teeth $p$ on the proximate ends of the harrow-drums, substantially as described.

2. The combination of the frame having the vertical openings in its front and rear end bars, with the drive-shaft mounted transversely in the frame, the drive-wheels thereon, and having the tappet-teeth; the shaft $h$, having its ends adjustable in the vertical openings of the front and rear end bars, the plates $k$, on the ends of said shaft, the adjusting and securing bolts $l$, and the revoluble harrow-drums mounted on said shaft $h$, and having the tappet-teeth engaging those of the drive-wheel, substantially as described.

In testimony whereof I affix my signature in presence of two witnesses.

WILEY MARTIN DIGBY.

Witnesses:
G. R. JUSTICE,
W. H. WHALEY.